US011394554B2

(12) United States Patent
Yadav et al.

(10) Patent No.: US 11,394,554 B2
(45) Date of Patent: Jul. 19, 2022

(54) DECENTRALIZED TRUST USING BLOCKCHAIN FOR TRACKING AND VALIDATION OF VOICE COMMUNICATIONS

(71) Applicant: PAYPAL, INC., San Jose, CA (US)

(72) Inventors: Meethil Vijay Yadav, Phoenix, AZ (US); Bradley Wardman, Phoenix, AZ (US); Braden Christopher Ericson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 410 days.

(21) Appl. No.: 16/399,952

(22) Filed: Apr. 30, 2019

(65) Prior Publication Data
US 2020/0351095 A1    Nov. 5, 2020

(51) Int. Cl.
*H04L 29/06* (2006.01)
*H04L 9/32* (2006.01)
*G06F 16/23* (2019.01)
*G06F 16/61* (2019.01)
*H04L 9/06* (2006.01)

(52) U.S. Cl.
CPC ........ *H04L 9/3231* (2013.01); *G06F 16/2365* (2019.01); *G06F 16/61* (2019.01); *H04L 9/0643* (2013.01); *H04L 9/3247* (2013.01); *H04L 2209/38* (2013.01); *H04L 2209/56* (2013.01)

(58) Field of Classification Search
CPC ... H04L 9/3231; H04L 9/0643; H04L 9/3247; H04L 2209/38; H04L 2209/56; G06F 16/61; G06F 16/2365

USPC ......................................................... 713/176
See application file for complete search history.

(56) References Cited

U.S. PATENT DOCUMENTS

| | | | |
|---|---|---|---|
| 9,953,231 B1 | 4/2018 | Medina, III et al. | |
| 10,212,593 B2* | 2/2019 | Rodriguez | H04W 4/80 |
| 2017/0279801 A1* | 9/2017 | Andrade | G06F 21/31 |
| 2020/0311101 A1* | 10/2020 | Snitzer | G06F 16/27 |

OTHER PUBLICATIONS

Lopez-Kleine et al., "Comparison of Distance Measures based on association coefficients for the detection of commonalities in multiple phenotypes", National University of Colombia, Department of Statistic, Investigacion en Salud, Monitor Estrategico, Jul.-Dec. 2014, pp. 75-84, No. 6, Superintendencia Nacional de Salud, Bogota, Colombia.

(Continued)

*Primary Examiner* — Evans Desrosiers
(74) *Attorney, Agent, or Firm* — Haynes and Boone, LLP

(57) ABSTRACT

Systems and methods of authenticating voice data using a ledger (blockchain). Examples include a scalable and seamless system that uses blockchain technologies to distribute trust of a conversation, authenticate persons in a conversation, track their characteristics and also to keep records of conversations. In some examples, smart phones, wearables, and Internet-of-Things (IoT) devices can be used to record and track conversations between individuals. These devices can each be used to create entries for the blockchain or a single device could be used to keep track of the entirety of the conversation. Fuzzy hashing may be used to compare newly created entries with previous entries on the ledger.

19 Claims, 10 Drawing Sheets

(56) References Cited

OTHER PUBLICATIONS

Grech, Matt, "Blockchain Will Change Everything, Even VoIP", Cloud Communication Advisor, Blog, [online]. Fresh Meadows (NY): GETVOip, May 8, 2017, 12 pages, [retrieved on Feb. 19, 2019], Retrieved from the Internet: <URL:https://getvoip.com/blog/2017/05/08/blockchain-and-voip/ >.
"Converging Blockchain and Voice Recording: a New Horizon in the Financial Compliance Space", Mar. 19, 2018, 2 pages, VERINT verba [online], [retrieved on Feb. 19, 2019]. Retrieved from the Internet: <URL:https://www.verba.com/compliance-blockchain-voice-recording/>.
"Ssdeep Project—ssdeep—Fuzzy hashing Program", 3 pages, GitHub [online], [retrieved on Feb. 19, 2019]. Retrieved from the Internet: <URL: https://ssdeep-proiect.github.io/ssdeep/index.html>.
Kornblum, Jesse, "Identifying almost identical files using context triggered piecewise hashing", The Digital Forensic Research Conference, Aug. 14-16, 2006, pp. s91-s97, Eisevier, Amsterdam, Netherlands.
International Search Report and Written Opinion, PCT/US20/30571, dated Jul. 6, 2020, 16 pages.

\* cited by examiner

CONVERSATIONS

| | TIME | MEMBERS | KEY | |
|---|---|---|---|---|
| 1. | 2019-02-03 10:30:13 | ALICE, BOB | 🔑 | ▲ |
| 2. | 2019-03-14 09:00:05 | CHRIS, DAVE | 🔑 | ▲ |

[ NEW CONVERSATION ]

DECENTRALIZED TRUST USING BLOCKCHAIN FOR TRACKING AND VALIDATION OF VOICE COMMUNICATIONS

BACKGROUND

The present disclosure generally relates to implementation and use of voice hash sets, and more particularly to tracking and validation of voice communications using blockchain.

Voice commands are becoming ubiquitous. Wearable technology with limited input interfaces use voice. Cellular phones allow users to write emails and send text messages entirely with voice. Virtual "personal assistants" such as the AMAZON ALEXA, APPLE SIRI, and GOOGLE ASSISTANT allow users to search for information, access their calendar, and control smart technologies and internet-of-things (IOT) devices using voice-based systems.

Blockchains, also referred to herein as distributed ledgers, are used to track transactions involving crypto currencies (also called virtual currencies) such as, for example, Bitcoin, Litecoin, Ethereum, Monero, and/or other crypto currencies known in the art as well as storage of data. Crypto currency systems provide decentralized digital money that is issued and maintained by distributed software running a network of computing devices, rather than by central banks or public authorities that conventionally issue and control fiat currencies. For example, Bitcoin is a type of decentralized crypto currency that provides for peer-to-peer transactions without an intermediary, with those peer-to-peer transactions verified by Bitcoin network nodes (i.e., the distributed network of computing devices) and recorded in a public distributed ledger referred to as a blockchain Crypto currencies like Bitcoin have revolutionized money transfer and payment technology by allowing for censorship resistant, decentralized peer-to-peer transfer of value between users.

Blockchains and distributed ledgers use a variety of techniques to ensure integrity and consensus of the ledger. One technique is proof of work, used in the Bitcoin network, which uses a bit of data (called a nonce) that is difficult to produce but easy for others to verify and which satisfies certain requirements. Another technique is proof of stake which allows a person to mine or validate block transactions according to how many coins the miner holds.

Distributed blockchains may also be used with a number of different other technologies besides virtual currency. For instance, Bitcoin, Ethereum, and other currency focused networks provide for the execution of a basic "contract" that transfers value between users and some have been created to store executable code. Other uses include data storage in a distributed manner.

BRIEF DESCRIPTION OF THE FIGURES

FIG. 6 is a schematic view illustrating an exemplary user interface for a conversations application;

Figure 1:
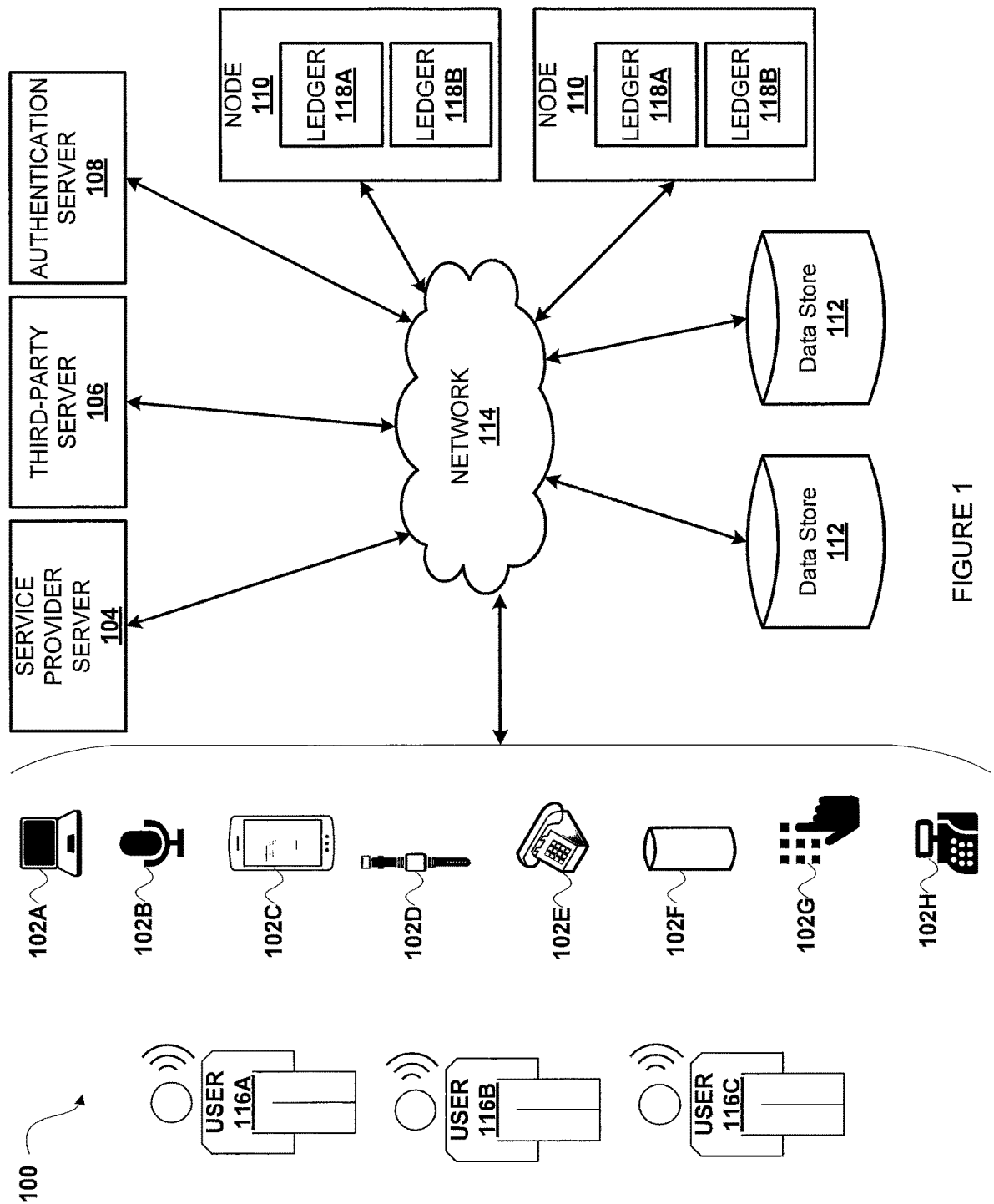
FIG. 1 is a schematic view illustrating an embodiment of a networked system for authenticating voice data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Storing a voice recording can take up significant disk space which is multiplied when storing many conversations or sentences spoken by individuals. This becomes even more complex when multiple people are in a conversation. One problem encountered is how to store information about entities in a conversation and other metadata about the conversation that can be stored and easily accessible for use in future conversations as a means to identify parties communicating with each other.

The use of voice for authentication and voice payments are emerging technologies. A user may have a conversation with some person or a group of people. One method to authorize or authenticate that the conversation happened includes recording the conversation and having each person acknowledge his/her statements in the conversation. Another method includes using voice recognition software to authenticate the participants in the conversation. In both cases, the entire trust relationship is centralized with either the people in the conversation or the voice recognition software.

In order to use voice conversations for initiating and processing transactions, service providers may wish to implement a system to not only authenticate and verify entities in the conversation, but to also store audio data that corresponds to the conversation as well as metadata associated with the audio data. This is because voice payments may be highly susceptible to fraud. For example, a user be impersonated by a malicious user and without proper authentication, unauthorized transactions may be performed. Such security concerns raise a serious question about the effectiveness of existing authentication and anti-fraud measures in this space. Multi-factor authentication can mitigate some of these security issues but can also potentially hamper a seamless voice-payment experience.

Customer service agents may authenticate customers on a phone call by requesting personal sensitive information like date of birth, month/year of account creation, address, social security number (SSN), password or phrase, etc. An authentication server may use the techniques disclosed herein (e.g., fuzzy hashing of the voice characteristics on the phone to the latest records in a ledger) to provide additional mechanism to authenticate the customer on the phone call.

Embodiments of the present disclosure include a scalable and seamless system that uses blockchain technologies to distribute trust of a conversation, authenticate participants to a conversation, track their characteristics (e.g., voice characteristics of participants) and also to keep records of conversations. In some examples, smart phones, wearables, Internet-of-Things (IoT) devices, etc. can be used to record and track conversations between individuals. These devices can each be used to create entries for the blockchain or a single device could be used to keep track of the entirety of the conversation.

In order for the system to know which participant is involved in the conversation, initial signatures/fingerprints may be generated for each participant. Devices, such as phones, IoT devices, etc. can be used for this purpose. These signatures can be generated using keywords from a conversation, specific words spoken, distinct phrases, or general speech of a user. Machine learning algorithms can be applied to the voice samples (e.g., pitch, tone, speaking speed, enunciation, intonation, rate, rhythm, etc. for specific keywords or overall speech) collected from a range of available devices such as phones, IoT devices, etc. to provide a more accurate signature.

Conversations may consist of statements from different people. Other conversations (e.g., monologues) may include only a single participant. In certain examples, multiple blocks are generated for each conversation. A single block may be generated for every person in the conversation. Each statement from every person may be entered in his/her specific block. Each statement may be considered as a transaction. Additionally, a key may be generated for a conversation and used to secure the voice recording to the participants or relevant parties to the conversation. Each transaction may include: a timestamp (for, e.g., offline synchronization), a unique identifier for the block (to keep track of statements in the block), a hash of the voice features of the statement (also referred to as a signature), and/or an encrypted version of statement (text conversion and/or the raw media) using the conversation key. This key may be provided to all members in the conversation. This may be done so that only the members in the conversation will have access to the actual statements in the conversation. Also, only those members may be able to regenerate the conversation later on in time. Alternatively, only the member who made the statement is able to decrypt their statements. This may be performed by giving each participant a separate key. In other examples, keys are given to participants such that a majority of participants need to agree to access a recording before it is made accessible. In other examples, a separate entity is given access to the conversation for trust and verification or because they are an interested party in the outcome of the conversation.

Once the blocks are generated, they may be sent to the blockchain system. The blockchain system may consist of different nodes that can be used to validate the blocks. Bitcoin, for example, uses a single ledger in order to keep track of transactions because there is only one universal condition that needs to be verified—that the total number of Bitcoins should be same after every transaction. In the case of conversations, the authentication of identities may be based on data that is specific to that participant/entity. Thus, multiple distributed ledgers may be maintained by the nodes, each ledger specific to each participant/entity. Additionally, the use of multiple ledgers may facilitate the ability to track how the voice of a participant evolves over time with their conversation.

When a node receives a block, the node may perform a number of actions to verify the authenticity of the block (and/or statements within the block) and add the block to a blockchain (a general blockchain or one that is user specific). The node may break the block into different statements. Using a hash comparison (e.g. fuzzy hashing) of the hash of voice features and the latest record in the ledger (e.g. threshold may be a 98% match), the node may identify the ledger to which the statement belongs. If found, that statement will be considered as valid. All statements in the block may then be verified using a similar procedure. If all statements in the block are valid, the block is considered as valid by the node and the records (e.g. timestamp, id of the block, voice hash, encrypted statement) are added to respective ledgers. The encrypted version of statement can be stored on a distributed file system with pointers to the files in the actual blocks. This may reduce the data storage requirement of the ledger(s) on the nodes.

When a new block is added to the ledger, the hash (signature) of the previous block may be added to it in order to create a chain, which can be useful to ensure no data loss or data tampering. Similar to other blockchain systems, as a new block is added to the ledgers, updated ledgers are sent to all or substantially all the other nodes. If any of the statements are found to be invalid such that no matching ledger is found or due to tampering of data, the entire block may be discarded. Alternatively, individual statements/transactions within a block are discarded and the rest of the statements/transactions are included in the block.

By using this method, trust about a conversation may be distributed between all entities in the conversation, a voice recognition function, and voice recognition history from previous conversations of the entity. The conversation may be considered valid and added to the blockchain system, only if all the blocks are valid. In other words, the authentication of a single entity in the conversation, may not be enough for portions (or the entirety) of the conversation to be validated. As the records in the ledger have block identifiers (i.e., IDs), the conversation may be rebuilt at any point of time. Service providers may use composite key systems along with hashing in order to have access to all the encrypted conversations.

Other embodiments of the present disclosure include use of the described system to authenticate individual users, as part of a voice-based payment system, and the use of offline synching of recordings.

Referring now to FIG. 1, an embodiment of a networked system 100 is illustrated. The networked system 100 includes a plurality of user devices 102A-H, a service provider server 104 (e.g. a payment provider server), a third-party server 106 (e.g., of a merchant), an authentication server 108, nodes 110, and data stores 112 in communication over network 114. Participants/users 116A-C of user devices 102A-H may use the devices to record audio/conversations, perform voice authentication, and/or make payments using voice. However, the embodiments herein are meant to be merely exemplary, and one of skill in the art in possession of the present disclosure will recognize that a wide variety of system providers may operate, alone or together, to provide the systems and methods discussed herein without departing from the scope of the present disclosure.

User devices 102A-H, a service provider server 104, a third-party server, 106, an authentication server 108, nodes 110, and data stores 112 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 114.

The network 114 may be implemented as a single network or a combination of multiple networks. For example, in various embodiments, the network 114 may include the Internet and/or one or more intranets, landline networks, wireless networks (e.g. cellular, personal area networks, Wi-Fi), and/or other appropriate types of networks.

User devices 102 may be implemented using any appropriate combination of hardware and/or software configured for wired and/or wireless communication over network 114. For example, in one embodiment, the user device 102A may include a personal computer device. The personal computer may include a desktop or laptop device. The personal computer may include software (e.g., applications or a browser interface) to perform voice authentication, voice payments, and/or conversation recording/authenticating. In other embodiments, the user devices 102 may be a smart microphone 102B, smart phone 102C, wearable computing device such as smart watch 102D, smart home hub device 102F (e.g., an AMAZON ECHO or GOOGLE HOME device), security system device 102G, and point-of-sale device 102 H, an IoT device, and/or other types of computing devices. User devices 102 may include devices without processing technology (e.g., "dumb" devices) such as telephone 102E or a standard microphone. These devices may be connected (via network 114, directly, or via another network e.g., a telephone network) to other devices that can perform voice authentication, voice payments, and/or conversation recording/authenticating functions. User devices 102 may include any of a variety of computing devices such as desktop computing systems, laptop/notebook computing systems, tablet computing systems, mobile phones, Application Specific Integrated Circuit (ASIC) computing systems, and/or other computing device known in the art. Each of the foregoing user devices 102 may include or be connected to one or more audio recording devices.

User devices 102 may include one or more applications, e.g., browser applications which may be used, for example, to provide an interface to permit the user to browse information available over the network 114. For example, in one embodiment, the application may be a web browser configured to view information available over the Internet. In one embodiment, user devices 102 may be able to connect to service provider server 104 to perform a voice-based payment transaction. Third-party server 106 and/or service provider server 104 may include a voice based or graphical electronic commerce interface may include a storefront where a user 116 of user devices 102 may browse, search, and purchase different products or to confirm a transaction that is occurring off-network (e.g., at a store, restaurant or food truck, farmer's market, craft fair, and/or service provider). In one embodiment, service provider server 104 or authentication server 108 may provide voice authentication of the identity of a user 116. Voice authentication may be used by a customer service phone line to authenticate user 116 in order to provide customer support, discuss or modify account or billing information, or process a payment. In another embodiment, multiple users 116A-C may memorialize a conversation. One or more user devices 102 may record the conversation, send the conversation in blocks to node 110. Users 116 may be authenticated (by node 110, authentication server 108, or user device 102). The conversation may be encrypted with a key, and the key may be sent to each of the authenticated participants of the conversation for later access. Users 116 may use the user device 102 to play back the recorded conversation via a graphical or auditory interface using the key.

In particular, the other applications on user device 102 may include a payment application for payments processed by service provider server 104. The other applications may also include security applications for implementing user-side security features, programmatic user applications for interfacing with appropriate application programming interfaces (APIs) over the network 114, or other types of applications. Email and/or text applications may also be included, which allow the user to send and receive emails and/or text messages through the network 114. User devices 102 may include one or more user and/or device identifiers which may be implemented, for example, as operating system registry entries, cookies associated with the browser application, identifiers associated with hardware of the user devices 102, or other appropriate identifiers, such as a phone number.

In the illustrated embodiment, system 100 may also include nodes 110 that include one or more distributed ledgers 118. In other embodiments, the nodes do not store ledgers 118 and instead ledgers 118 are coupled to node 110 via a network (e.g., network 114) or another means. Node(s) 110 may operate to generate/maintain one or more distributed ledger(s) 118. The multiple ledgers 118 may include a ledger for each authenticated user 116 of system 100. In other embodiments, a single ledger 118 is maintained that contains information about multiple users. In some embodiments, nodes 110 may operate to generate (a.k.a. "mine") crypto currency while creating the distributed ledger 118 (also referred to as a blockchain) and maintain the distributed ledger 118 while performing other functions detailed herein. In other embodiments, nodes 110 do not mine crypto-currency. Distributed ledger(s) 118 described herein may be a public, private, or consortium distributed ledger or a combination of multiple types. Nodes 110 may be queried, e.g., by user device 102, service provider server 104, third-party server 106, and/or authentication server 108, to provide information regarding a block in ledger 118. Nodes 110 may also be configured to receive a block from a user device 102 (or other device such as service provider server 104, third-party server 106, and/or authentication server 108) and determine the proper ledger 118A or 118B for the block, verify the statements/transactions in the block, and add the block to the appropriate ledger (associated with the appropriate user 116).

Node(s) 110 may be configured to store data in data store 112. The data stored in data store 112 may include (encrypted) audio data. The audio data may then be pointed (e.g., linked) to in blocks in ledger 118 rather than storing them on ledger 118 directly. This may allow for a smaller sized ledger 118 than if the encrypted audio was stored on ledger 118 directly.

In some embodiments, service providers may use system 100 to track conversations of meetings or use system 100 for validation of conversations and authentication of customers for any type of transaction. The service provider may use its servers, such as service provider server 104 and/or third-party server 106, as nodes, such as node 110 of ledgers 118 for validation of the blocks (e.g., mining), and as data stores 112. A service provider many use system 100 in order to validate/authenticate users 116, rather than merely relying on voice recognition software. System 100 may also offer an improved distributive solution for keeping records of conversations over simply storing audio files.

In other embodiments, multiple service providers may use the same blockchain network. In one example, the service providers may be trusted entities so rogue service providers are unable to add malicious content to the system. Each service provider may separately maintain nodes, such as nodes 110 and validate blocks. Audio (or encrypted audio) may be stored by the nodes 110 that added the block to the ledger. The audio (or encrypted audio) may be stored in the block chain. Alternatively, the audio (or encrypted audio) may be stored in data store 112 and a link to the data may be stored in the block chain. Service providers may then leverage a common (or another entity's) platform for validation and authentication of identities in a conversation. For example, an organization or service provider might have more data about an entity (customer, participant) than another service provider. In which case, the second service provider can leverage the data that is already vetted and stored in the ledger 118 for the entity.

Further still, while illustrated in FIG. 1 and discussed in some embodiments below as operating separately to perform separate functions, in some embodiments, the functionality of the described devices 102-110 may be combined such that computing devices in a distributed network operate to maintain distributed ledger(s) 118 while also operating to provide authentication, an ecommerce platform, or payment services as discussed below. Thus, while a specific embodiment has been illustrated, one of skill in the art in possession of the present disclosure will appreciate that system 100 illustrated in FIG. 1 may include a variety of modification while remaining within the scope of the present disclosure.

Figure 2:
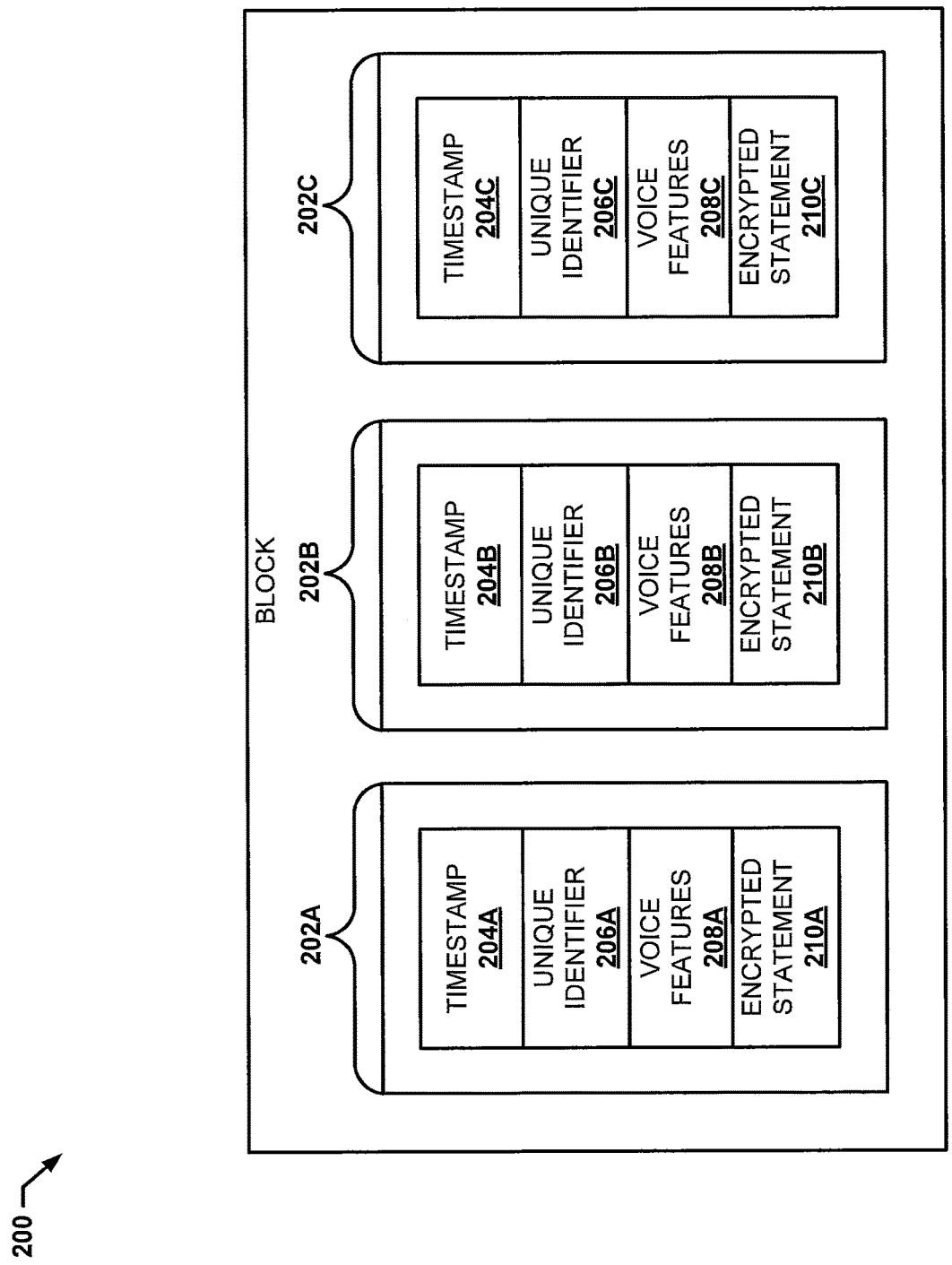
FIG. 2 is a schematic view illustrating an embodiment of a block of voice data.

Referring now to FIG. 2, an embodiment of a block 200 is illustrated and described briefly for reference in the discussion below. User device 102 may generate block 200 during a recorded conversation between one or more users 116. Block 200 may also be generated by service provider server 104, third-party server 106, or authentication server 108 in response to a payment transaction or authentication request involving user 116. User device 102 may generate a separate block for each user 116 in the conversation. User device 102 may send the blocks, including block 200, to a node 110 for inclusion in a ledger 118.

User device 102 may generate block 200. Block 200 may be generated during a conversation, during a voice-based payment transaction, or during an authentication operation. Block 200 may be generated with statements of participant 116A for a particular conversation, transaction, or authentication. In one example, block 200 may be generated for participant 116A when participating in a conversation with other participants 116B and 116C and appended on the ledger 118 associated with participant 116A. Another block may be generated for participant 116A when participant 116A enters into a voice-based purchase at a store and appended to ledger 118 associated with participant 116A. Another block may be generated for participant 116A when participant 116A authenticates their voice during a phone call with their bank and appended to the ledger 118 associated with participant 116.

Ledger 118 may include various blocks generated for different purposes (e.g., conversation tracking, transactions, authentication, etc.) Alternatively, different ledgers 118 may be designated and used for separate purposes (e.g., conversation tracking based blocks would be stored in a separate ledger from voice-transactions).

Block 200 may be sent to node 110 for verification and inclusion in ledger 118. Block 200 includes one or more transactions 202A-C. Each transaction 202 may be a data structure that includes timestamp 204, unique identifier 206, voice features 208, and encrypted statement 210. Transaction 202 may also include an unencrypted statement in addition to or in place of encrypted statement 210. Additional information may be included in block 200 to perform other functions such as to record currency transactions or electronic coins, recording and/or tracking a variety of other information such as credit information, identity information, medical information, education information, other personal user information, shipment information, food traceability, property ownership, and/or any other data suitable for recording and/or tracking.

User device 102 may detect the number of entities in a conversation but also detect statements said by each entity. User device 102 may perform these detection tasks locally or may send the raw data to another device (e.g. authentication server 108 or service provider server 104) for analysis. Statements in transaction 202 may be broken up by sentence, a predetermined or user defined number of words, length of time, a threshold amount of pause time, a change of speakers or a combination of the foregoing. Statements may also include an entire length of time a participant 116A speaks until a second participant 116B is detected as speaking. User device 102 may use language processing tools to break up statements into individual phrases or sentences. The language processing tools may include tools that use a machine learning algorithm used to break up human speech patterns into individual segments (e.g., words, phrases, sentences, paragraphs). In an example, a pre-defined maximum duration of a statement may be set for breaking up statements into transactions. A transaction may be broken up into multiple transactions if the system detects statements from a different entity or if the duration of the statement exceeds the pre-defined maximum. This technique may ensure a maximum size for a transaction and in turn ensure the maximum size of a block.

Timestamp 204 may include the time the transaction 202 was recorded. The timestamp may be in one of a variety of formats and include year, month, day, hour, minute, and second information. Month information may be included as a number, or as a word, or abbreviated word. In further embodiments, sub-second information (milliseconds, microseconds, nanoseconds, etc.) may be included. In other embodiments, meridian and/or time zone information is included in timestamp 204. Exemplary formats include: YYYY-MM-DD hh:mm:ss.sTZD (where TZD represents a timezone offset) or any subset or combination of the foregoing data. Alternatively, timestamp 204 may be recorded as POSIX timestamp, the number of seconds that have elapsed since Jan. 1, 1970.

Timestamp 204 may be used to perform an offline synchronization of blocks of data. In certain embodiments, if user device 102 which generated block 200 is offline (e.g., not connected to network 114 and nodes 110), user device 102 may not be able to send blocks to be added to ledger 118. When device 102 reconnects to network 114, generated blocks may then be sent to nodes 110 to add the blocks 200 to the appropriate ledger 118. Node 110 may order transactions/statements in ledger 118 based on the value in timestamp 204. Node 110 may use the timestamp in the current transaction to find the location in ledger 118 where transaction 202 belongs. Following finding the proper chronological place for the transaction, node 110 may verify transaction 202 (or the statement contained in transaction 202) using hash comparisons with the transaction 202 or block 200 which is before it and after it (chronologically) for validation.

Unique identifier 206 may be any number and/or character set to uniquely identify a block. Unique identifier 206 may be used to keep track of transactions (or individual statements) in a block. In one embodiment, transactions are tied, using unique identifier 206, to a particular block 202 which is tied to a particular conversation, transaction, or authentication event. Unique identifiers 206A-C may be sequentially numbered. In other embodiments, unique identifiers 206A-C are randomly assigned. In further embodiments, unique identifiers 206A-C are assigned based on the data within the transaction 202.

Voice features 208 may be extracted from audio data of each corresponding statement. For instance, voice features 208A may be extracted from the audio data corresponding to the statement represented by transaction 202A, voice features 208B may be extracted from the audio data corresponding to the statement represented by transaction 202B, and voice features 208C may be extracted from the audio data corresponding to the statement represented by transaction 202C. The voice features may include data related to the pitch, tone, volume, inflection on specific terms, commonly used vernacular, and/or rate of speech. Voice features 208 may also include data related to voice quality (e.g., normal, breathy, hoarse, husky, whispered), pitch range, loudness, nasal resonance (hypernasal, hyponasal, normal), oral resonance (guttural speech), flexibility, stamina, prosody, and other tonal characteristics (e.g., glottal fry, diplophonia, phonation breaks). In certain embodiments, the voice features 208 stored by the (data structures 202A-C) may be stored in plain text (i.e. not hashed).

In other embodiments, the data structures 202A-C may store respective hashes of the voice features 208A-C, rather than the voice features 208A-C themselves. The hash of voice features 208 may include a fuzzy hashing of the voice features 208 or fuzzy hashing of a string made from a concatenation of voice features 208. A fuzzy hashing algorithm (also known as a context triggered piecewise hashing (CTPH), for example, the spamsum algorithm) may be used to identify homologous sequences between unknown inputs and known files. The CTPH combines the concepts of piecewise hashing and rolling hashing as described in Kornblum, Jesse, *Identifying Almost Identical Files Using Context Triggered Piecewise Hashing*, The Digital Forensic Research Conference, Aug. 14-16, 2006 incorporated by reference in its entirety.

As will be described in further detail below, the hash of voice features 208 may be compared to other hashes (stored, e.g., in ledger 118). The hashes may be compared using distance algorithms. For example, an edit distance algorithm may be used to compare the two hashes and produce a match score from 0-100, where 0 represents no homology and 100 indicates identical or almost identical hashes. In other embodiments, sets of hashes may be compared using a set comparison algorithm such as Jaccard or Kulczynski coefficients as distance metrics to determine a similarity between hashes, as described in López Kleine, Liliana et al., *Comparison of Distance Measures Based on Association Coefficients for the Detection of Commonalities in Multiple Phenotypes*, Monitor Estratégico No. 6, 2014 incorporated by reference in its entirety.

In another embodiment, the hash of voice features 208 may include a cryptographic hash function such as MD5, MD6, SHA-1, SHA-2, SHA-3, BLAKE2, FNV, or any other one-way hash algorithm.

Encrypted statement 210 may include an encrypted segment of audio data or an encrypted text transcript of audio data. The encrypted statement 210 may be split from a larger audio segment (a conversation). In an exemplary embodiment, user device 102 may split an audio conversation into smaller units (1) after detecting another user 116 speaking, (2) at a particular time interval, (3) during a pause in the audio, or (4) during a combination of the above. The statement may be encrypted using one or more symmetric or public key (asymmetric) based encryption algorithms such as AES, DES, Triple DES, RSA, Blowfish, Twofish, or any other encryption algorithm. The statement may be encrypted using a key. The key may be a public key associated with user 116 or may be a key assigned to the conversation (or statement). For an assigned key, user device 102 may provide the key to all participants in the conversation. Additionally, the key may be provided to a third-party entity or server. Service providers may use a composite key system along with hashing in order to have access to all or substantially all conversations. Alternatively, the key may be provided only to the user 116 who made the statement. In some embodiments, the unencrypted statement may be sent, for example in block 200, to node 110. The statement may then be encrypted at node 110 or stored in plaintext. Encrypted statement 210 may be removed from block 200 and stored in an external data store 112. In such instances, node 110 may include a description of the location (e.g., a link) of encrypted statement 210 in statement 202, when adding block 200 to ledger 118.

Figure 3:
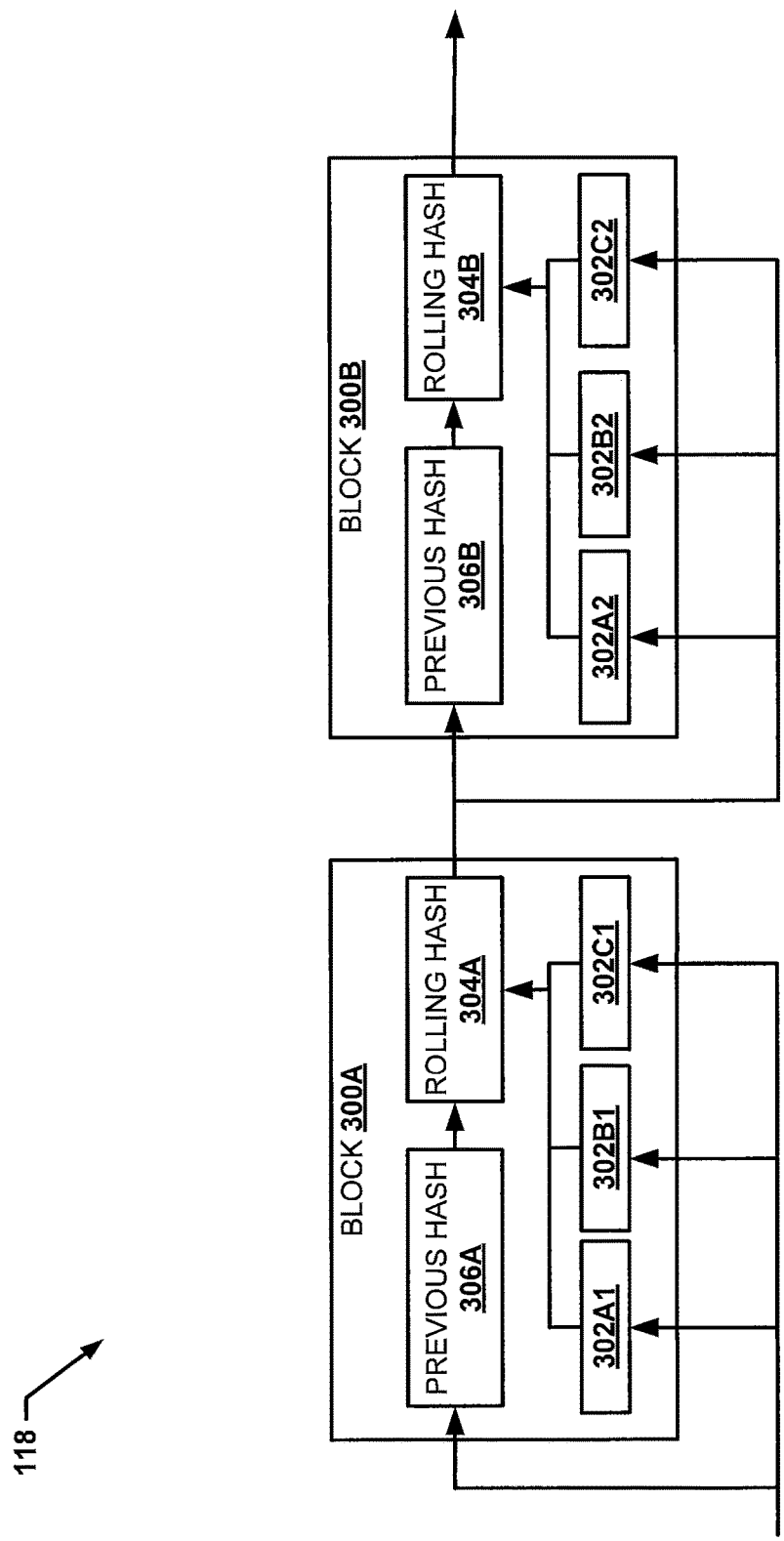
FIG. 3 is a schematic view illustrating an embodiment of a distributed ledger.
Figure 4:
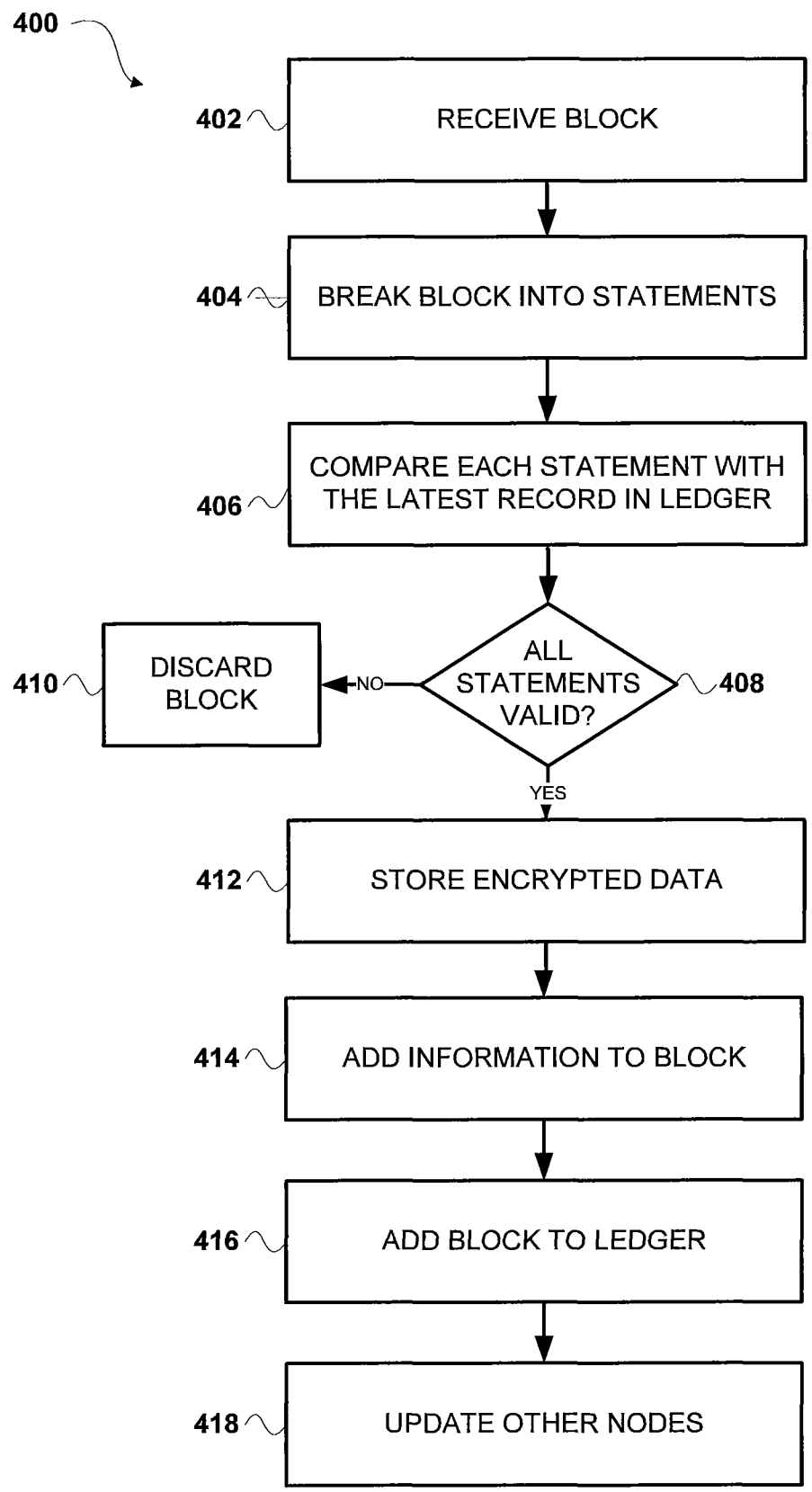
FIG. 4 is a flow chart illustrating an embodiment of a method for adding a block to the ledger.

Referring now to FIG. 3 and FIG. 4, an embodiment of distributed ledger 118 is illustrated and described briefly for reference in the discussion below. Ledger 118 may include a chain of blocks 300A, 300B. The chain of blocks in ledger 118 may begin with a genesis block generated using a signature of voice features of a participant 116. Ledger 118 may grow to include more blocks as they are added to ledger 118 from verified conversations, (voice-based) payment transactions, and user authentications of participant 116. Node 110 may append blocks (e.g., block 200) or individual transactions (e.g., transaction 202A) on to ledger 118 received from devices, e.g., user device 102 where the block/transactions are verified by node 110.

Each block may include a copy of a hash from a previous block 306, a rolling hash 304, and one or more transactions 302A1-302C1 and 302A2-302C2. Transactions 302 may include the same or similar data to transactions 202.

Node 110 may receive block 200 with transactions 202A-C from user device 102 or another node 110 (at operation 402). In some embodiments, node 110 may receive multiple blocks from user device 102 associated with the same occurrence (e.g., conversation, voice-transaction, authentication). Node 110 may determine whether a block 200 and/or statements 202 in block 200 can be verified on any ledger 118 of a plurality of ledgers 118.

Node 110 may break block 200 into the different statements 202A, 202B, and 202C (at operation 404). Using a hash comparison (e.g., leveraging fuzzy hashing and similarity computations), node 110 may compare a hash of voice features 208A to rolling hash 304A, the last rolling hash in ledger 118 (at operation 406). A rolling hash (also known as a recursive hash or a rolling checksum) may include a hash where the input is hashed in a window that moves through the input.

If voice features 208A are similar (e.g., within a threshold deviation or above a threshold match) to the rolling hash 304, node 110 may determine that there is a match. If a match is found, node 110 may add block 200 to ledger 118. If a match is not found, node 110 may (1) compare voice features 208A with rolling hashes in the last block of a different ledger, (2) create a new ledger for block 200, or (3) discard the block (e.g., if node 110 determines that all transactions in a block do not validate to the same user). Similarity may be based on a comparison of hash values being above a threshold value (e.g. values of 85, 90, or 95). In other examples, similarity can be determined between sets of hashes using Jaccard or Kulczynski coefficients as distance metrics. Threshold values may include a 95%, 98%, or 99% similarity value or distance metric. The threshold value may be a predetermined value or may be determined based on characteristics of ledger 118, rolling hash 304A, and/or hash of voice features 208A. Hashes (e.g. cryptographic or fuzzy hashes) of voice features between two different blocks may be compared against one another, and if there is enough overlap/similarity (i.e., based on the threshold value) between the two blocks, then they may be considered validated. For example, blocks 300A and 300B have a set of, e.g., ten, voice features (e.g., voice quality (e.g., voice quality (e.g., normal, breathy, hoarse, husky, whispered), pitch range, loudness, nasal resonance, and oral resonance). Each voice feature has a fuzzy hash. In this example, the threshold for comparison between fuzzy hashes is 95 and the Jaccard similarly score is set to 75%. The fuzzy hashes of each feature in block 300A would be compared to the fuzzy hashes of block 300B so that a match is acknowledged if fuzzy hashes from each block have a fuzzy comparison score of over 95. After all hashes of voice features have been compared between the two blocks, there would be a notation of the number of fuzzy matches (i.e. over 95) and a number of non-fuzzy matches. The Jaccard coefficient may measure the similarity of the intersection of the two sets over the union. In this example, if 8 of the 10 hashes matched based on the fuzzy comparisons (i.e. over 95), then the Jaccard coefficient would produce a score of 0.8 or 80%, and therefore would be considered a match as it is over the 75% similarity score. Similarity may also be based upon checking the base 10 number of hash to be less than a certain value. If a match is found, node 110 may determine the statement is considered valid. If a match is not found, node 110 may search other ledgers 118 (associated with other users 116) and determine whether the hash of voice features 208 is similar to the last rolling hash in that ledger. Each statement 202 in block 200 is likewise checked by node 110.

If node 110 determines that each statement is not valid (at operation 408, "no" branch), that the hash of voice features 208 of each transaction 202 are not similar to rolling hash 304A of ledger 118, node 110 may discard block 200 (at operation 410). Node 110 may also compare the hash of voice features 208 within each transaction 202 with a last rolling hash of blocks in other ledgers 118 (e.g., associated with different participants). Node 110 may also start a new ledger associated with the participant using block 200 as the genesis block of the new ledger 118. In an example, if a user 116 does not match any known user (e.g., where there is no match to a ledger), the user 116 may be asked to register for the system and a ledger 118 may be created. The user 116 may be asked to say one or more phrases (e.g., a set of predefined phrases) to a device 102 from which the voice characteristics can be extracted. A genesis block may be created from the phrases said by the user 116. Block 200 may then be matched to this genesis block on this newly formed ledger.

If node 110 determines that each statement is valid (at operation 408, "yes" branch), that the hash of voice features 208 of each statement 202 are similar to rolling hash 304A of ledger 118, node 110 may store encrypted statements 210A-C from block 200 in data store 112 (at operation 412). Node 110 may remove the encrypted statements from block 200 or generate a new block 300B. Node 110 may add additional information to block 300B including rolling hash 304A of the previous block 300A to block 300B as previous hash 306B (at operation 414). Node 110 may also add the location of (e.g., a link or pointer to) the encrypted statements in data store 112. Node 110 may also add a new rolling hash to ledger 118 including information from the new block 300B.

Node 110 may add new block 300B to ledger 118 (at step 416). Updates to ledger 118, including the addition of new block 300B, may be sent to other nodes 110 (at operation 418).

Figure 5:
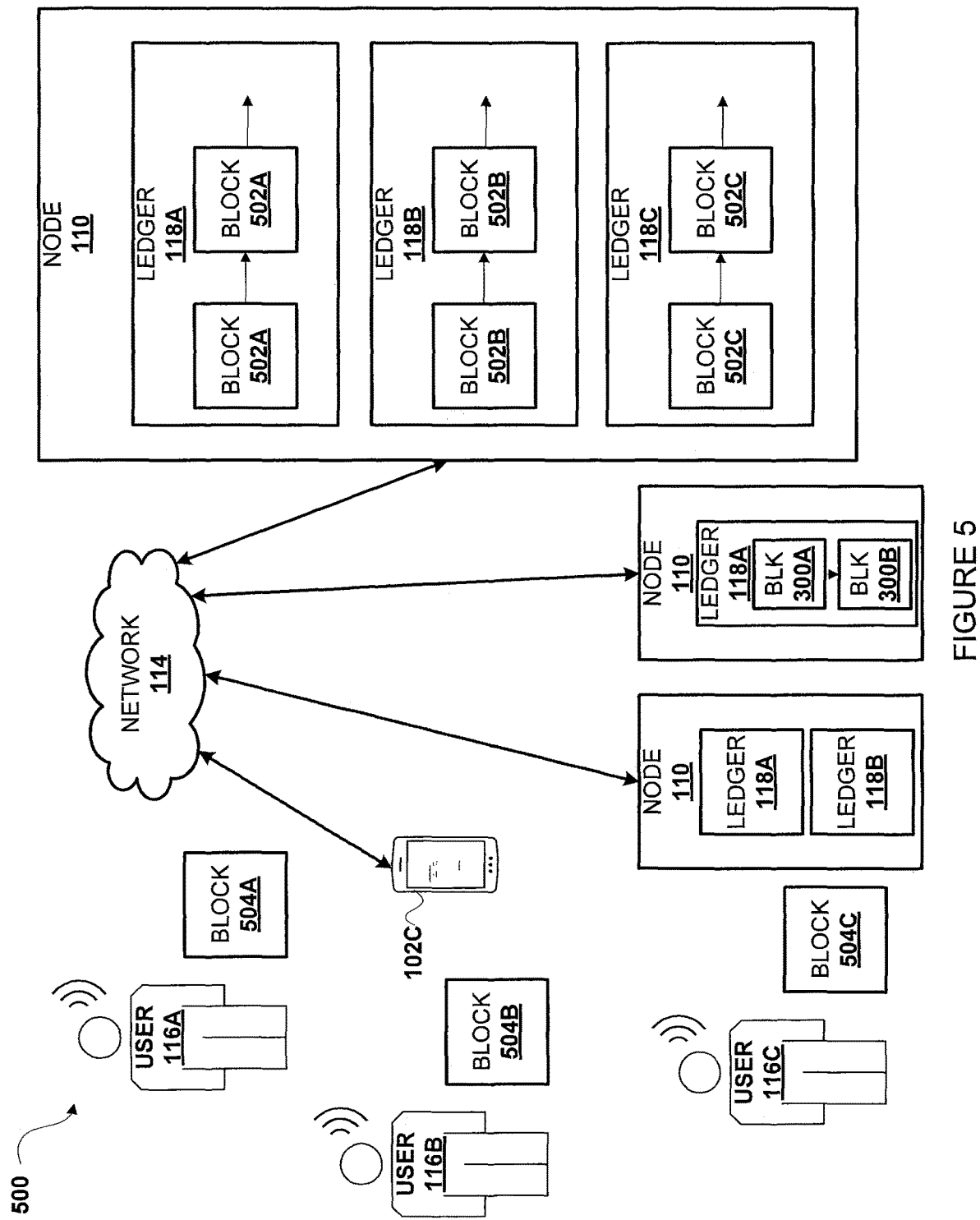
FIG. 5 is a schematic view illustrating an embodiment of a networked system for authenticating voice data.

Referring now to FIG. 5, a conceptual diagram of exemplary system 500 is illustrated that, in some embodiments, may be used to store a voice recording of a conversation and information related to the conversation among multiple individuals. Referring also to FIG. 6, a conceptual diagram of an exemplary user interface 600 of an application on user device 102C is illustrated.

Participant 116A, participant 116B, and participant 116C may want to digitally memorialize a conversation they are having. Participants 116 may use user device 102C to record and memorialize the conversation on a ledger. Participant 116A may run the conversation application 600 on user device 102C and click the "New Conversation" button. The conversation application 600 of user device 102C may begin recording the conversation between participant 116A, participant 116B, and participant 116C. User device 102C running the conversation application 600 may identify the number of different speakers, three in the present example, in the conversation. User device 102C running the conversation application 600 may create a separate block 504A, 504B, and 504C for each of the parties (participants 116A, 116B, and 116C) to the conversation. User device 102C running the conversation application 600 may split the recording into a series of statements. Each statement may be made by a single participant 116A, 116B, or 116C. User device 102C running the conversation application 600 may encrypt each statement using a key. The key may be generated for the conversation. In this example, the same key may be used to encrypt each of the statements and for each of the blocks. A preliminary determination may be made, by user device 102C running the conversation application 600, as to which user spoke the statement. Each of the statements may also be associated with a timestamp, a unique identifier, and a hash of voice features which may be added to the respective block. At the end of a conversation, a participant 116 may select a button to end the conversation. User device 102C running the conversation application 600 may send the generated blocks 504A-C to node 110 via network 114. As was described with respect to FIGS. 2-4, node 110 may validate each block by finding an associated ledger for each block and validate each statement in blocks 504A-C with the latest record in the respective ledger 118A-C. After adding or rejecting blocks 504A-C, node 110 may send an indication that blocks were validated and/or rejected to user device 102C. User device 102C may display the indication via a graphic or audio user interface. Node 110 or user device 102C may send the encryption key to user devices 102 associated with the other users for use in conversation application 600 running on those user devices 102. In some embodiments, participants in a conversation may send the key and conversation data to a device associated with a non-conversation participant or entity, which would enable that entity or non-conversation participant to access the stored conversation. In some embodiments, a complete (encrypted) recording of the conversation is stored in data store 112 and/or locally on user device 102.

Non-vocal participants to the conversation may not be included in the list or number of participants and may not receive a key to access the conversation. A notification may be displayed to have all participants introduce themselves to ensure that they are added as a participant in the conversation and automatically receive the decryption key.

Conversation application 600 may list all conversations accessible by a user as rows on a user interface. Conversation application 600 may include timestamp information for when the recorded conversation began (or ended), authenticated members of the conversation, information regarding the cryptographic key, and information as to where the conversation is stored. In certain embodiments, information regarding the conversation is stored in one or more ledgers 118. If a user selects a play option, conversation application 600 may retrieve blocks associated with the conversation from one or more ledgers 118 from a node 110 and recreate the conversation by downloading encrypted statements from data store 112 (using information in the retrieved blocks) and unencrypt the statements using the key. Alternatively, conversation application 600 may have a complete stored copy of the selected conversation locally or accessible via a link to data store 112. In this example, conversation application 600 may download and decrypt the conversation using the key and play the decrypted conversation without the need to recreate it from individual statements.

Figure 7:
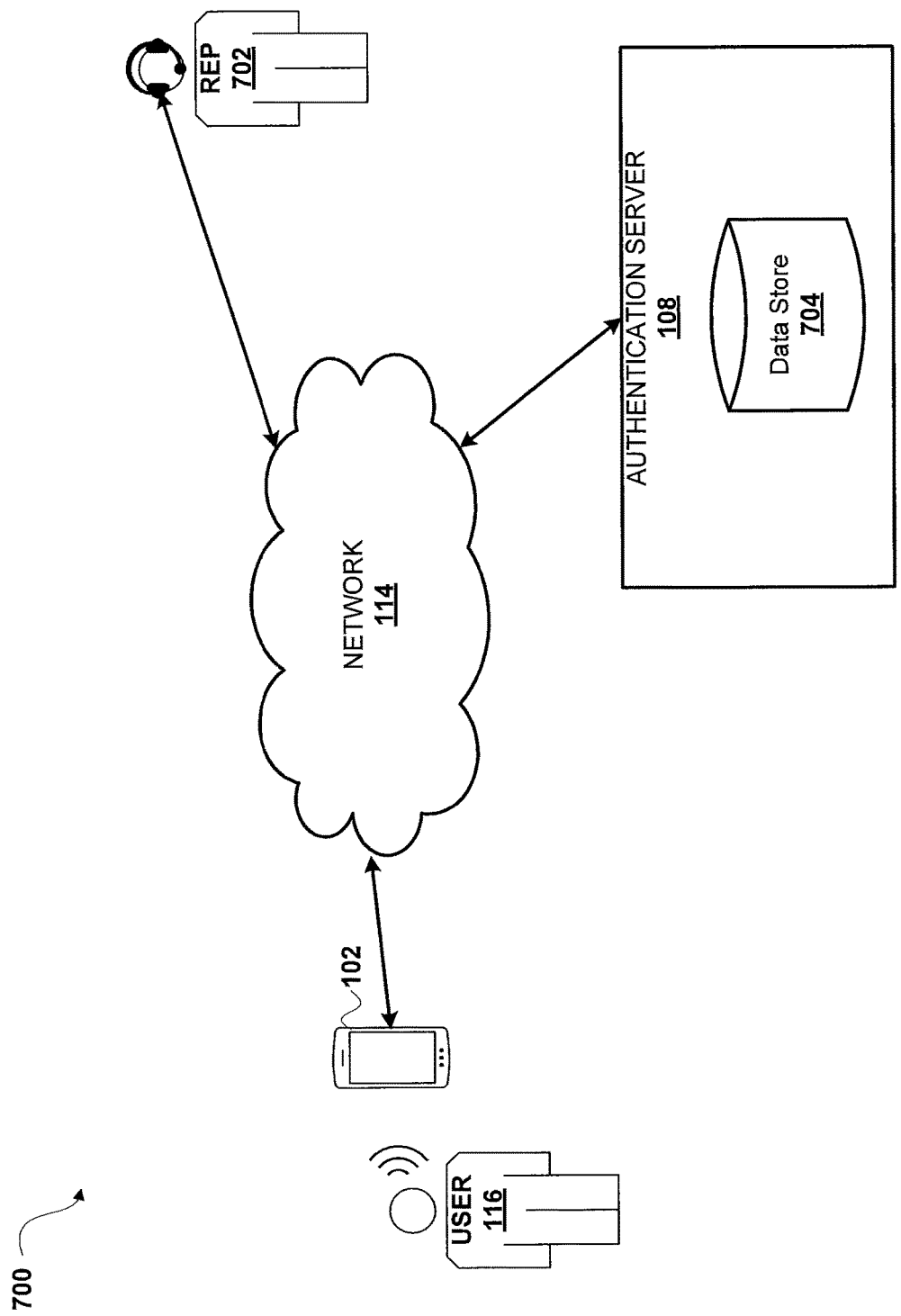
FIG. 7 is a schematic view illustrating an embodiment of a networked system for authenticating voice data.

Referring now to FIG. 7, a conceptual diagram of exemplary system 700 is illustrated that, in some embodiments, may be used to authenticate a user during a phone conversation.

Participant 116 may call, using user device 102, customer service for product support or for access to financial (e.g., bank, credit card company, insurance company, investment account), medical (e.g., doctor, hospital, insurance company, pharmacy), or other personal records (e.g., school, employer). When setting up an account, participant 116 may be asked to speak a predetermined statement for future voice authentication, or audio may be captured of user 116 during the phone interaction unrelated to voice authentication.

Customer service or authentication server 108 may extract voice features from the statement and using a fuzzy hashing algorithm create a quasi-unique identifier for participant 116. This identifier may be updated during subsequent interactions with the user and an updated identifier may be created by combining the previous hash information with newly extracted voice features of the subsequent interactions using a rolling fuzzy hashing algorithm.

Representative 702 may answer the call and wish to authenticate participant 116 to access their personal data, account, to share information known about the user, or to make changes to an account of participant 116. Representative 702 may record a statement of speech of participant 116. Representative 702 may send the recorded statement to authentication server 108 to authenticate participant 116. Authentication server 108 may extract voice features from the statement and take a (fuzzy) hash of the voice features. Alternatively, representative 702 may extract voice features from the statement and take a (fuzzy) hash of the voice features and send the hashed voice features to authentication server 108. Authentication server 108 may have a stored, in data store 704, hash of voice features previously received from participant 116 (e.g., the identifier). Authentication server 108 may then compare the newly received hashed voice features with the previously stored features and determine if the fuzzy hashes are similar to confirm the identity of participant 116. Similarity of the fuzzy hashes may be determined using, e.g., a distance metric (using e.g. Jaccard or Kulczynski coefficients) and compare the distance value with an appropriate threshold value. Authentication server 108 may send the result of the comparison to representative 702 to authenticate the participant. If the verification is positive, representative 702 may indicate that to participant 116 and communicate account details or make account changes based on interactions with participant 116. The hash of these voice features may be combined with the previous hash to update the hash using a rolling fuzzy hashing algorithm. If the verification is negative, representative 702 may request the user perform verification again or end the communication.

Figure 8:
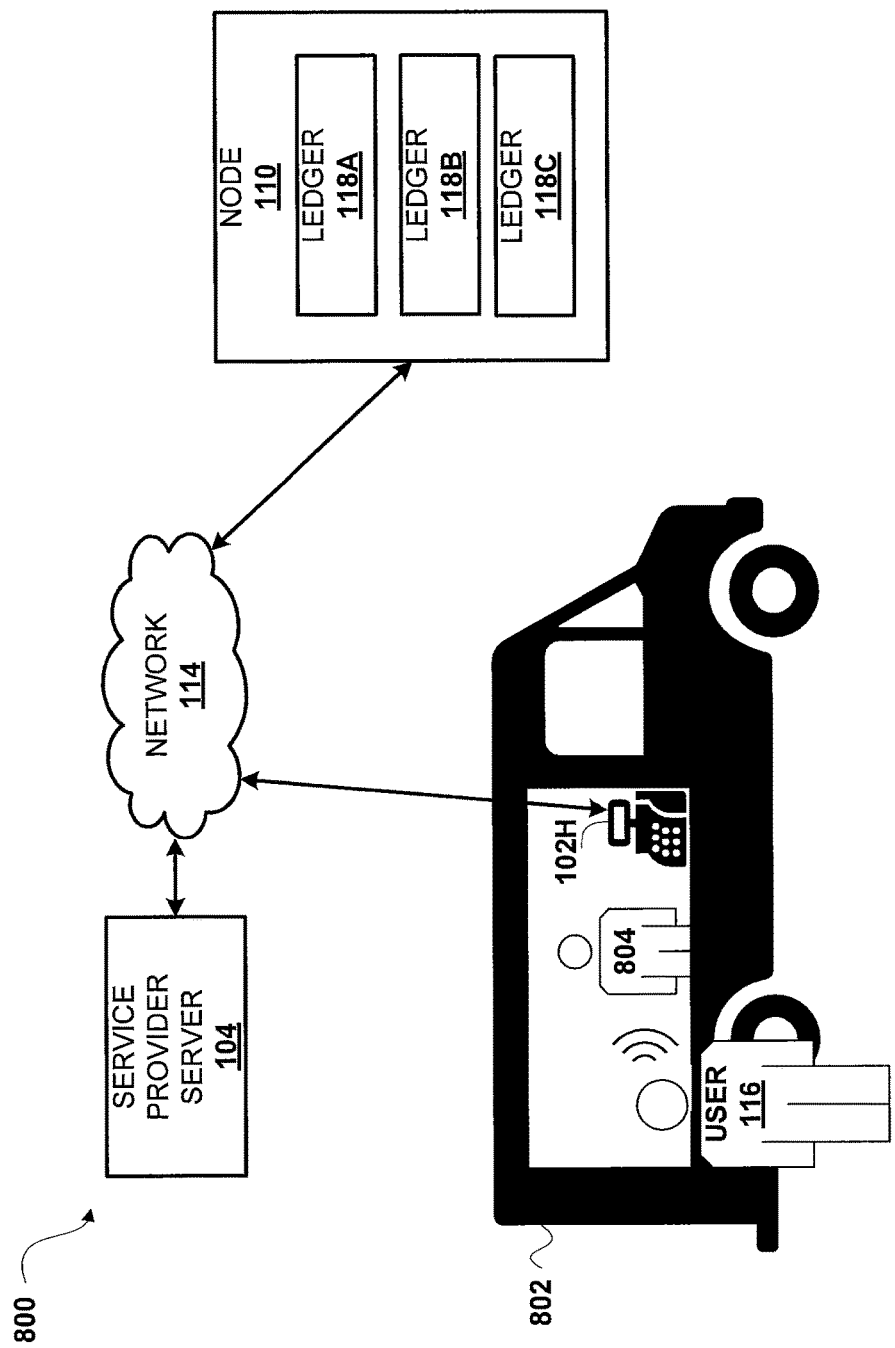
FIG. 8 is a schematic view illustrating an embodiment of a networked system for authenticating voice data and voice-based payment.

Referring now to FIG. 8, a conceptual diagram of exemplary system 800 is illustrated that, in some embodiments, may be used to process a voice-based purchase.

Participant 116 may initiate a voice transaction with a vendor 802. In the illustrated example, vendor 802 is a food truck. The voice transaction may include a food order. In other examples, the transaction may be for any good or service where payment is needed or provided.

An employee may ring up the order for participant 116 on point-of-sale (POS) 102H. The order may be for a particular amount of money. POS 102H may record the voice of user 116 during the ordering or check out process. POS 102H may send a message to service provider server 104 to authenticate the user. Service provider server 104 may determine the identity of participant 116 and determine whether participant 116 is authorized to make voice-based payments to send money to vendor 802.

In one embodiment, POS 102H may generate a block with one or more statements as shown in FIG. 2, including a fuzzy hash of voice features, and then add to a ledger 118A-C. Service provider server 104 may receive the block and send it to node 110 for inclusion in a ledger. Node 110 may compare the fuzzy hash of voice features with a hash value of the latest record in each ledger (118A-C) and try and find a match (as described above). If a match is found, node 110 may add the block to the appropriate ledger (as described in FIGS. 4 and 5). Alternatively, service provider server 104 compares the fuzzy hash of voice features without attempting to add a block to ledger 110A-C to find a match.

Node 110 may also alert service provider server 104 of the match. Payment service server 104 may combine the authenticated data with other data about participant 116 such as location data from a personal device, transaction data from a nearby vendor, communication data of vendor 802, and/or biometric/photographic data about participant 116) to determine a confidence value of determining the correct account. Service provider server 104 may use the confidence value to perform a risk analysis about whether to perform the transaction through voice alone. The risk analysis may also be based off the cost of the purchase (where a smaller transaction price is less risk). If the participant 116 was not identified or if the transaction was determined to be a high risk (e.g., above a price threshold amount, a purchase type, or other metric), service provider server 104 may alert POS 102H that the transaction failed and request another form of payment. If participant 116 was identified in the system and the transaction was not determined to be a high risk, a receipt can be generated for participant 116. Participant 116 can be prompted by POS 102H to confirm the transaction either verbally or via a button click on POS 102H. To make this transaction, participant 116 did not need to carry a credit card or a cellular phone or other device.

Figure 9:
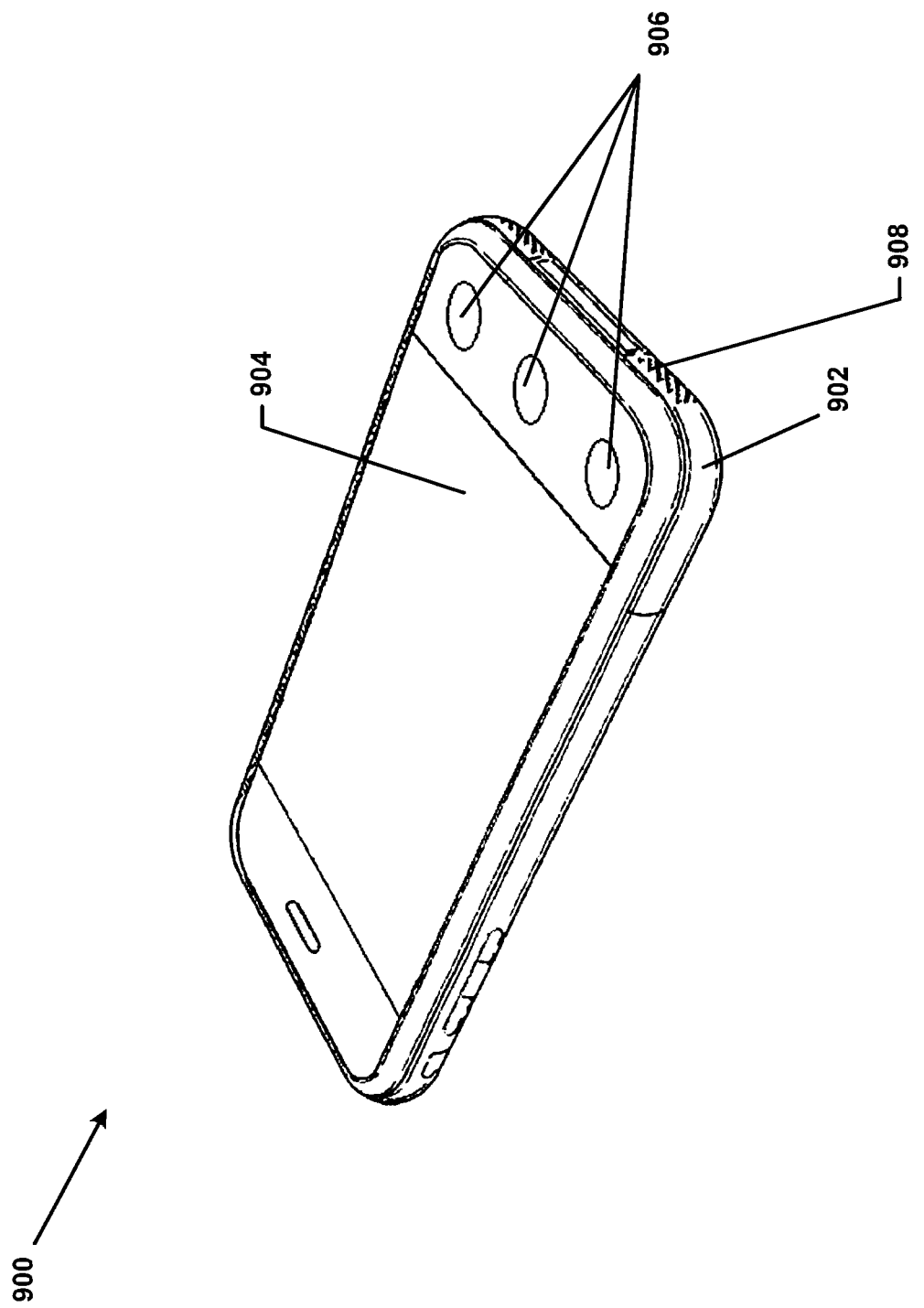
FIG. 9 is a perspective view illustrating an embodiment of a user device.

Referring now to FIG. 9, an embodiment of a device 900 is illustrated. The device 900 may be any of the user devices 102 discussed above. The device 900 includes a chassis 902 having a display 904 and an input device including the display 904, a plurality of input buttons 906, and a microphone 908. One of skill in the art will recognize that the device 900 is a portable or mobile phone including a touch screen input device and a plurality of input buttons and microphone that allow the functionality discussed above with reference to methods 400 and the building of block 200 in FIG. 2. However, a variety of other portable/mobile devices and/or desktop devices may be used in method 400 and the building of block 200 in FIG. 2 without departing from the scope of the present disclosure (e.g., user devices 102 described in FIG. 1).

Figure 10:
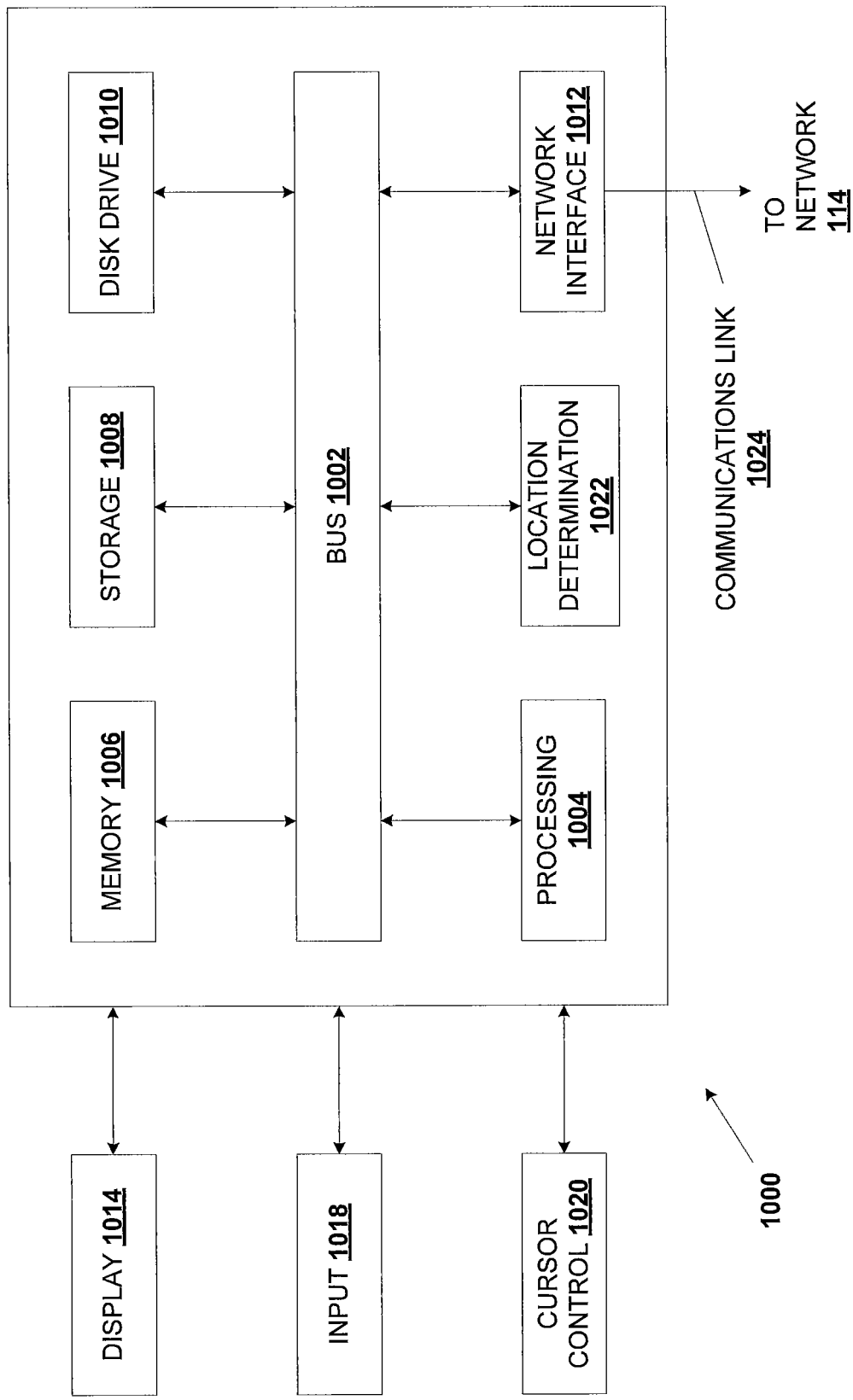
FIG. 10 is a schematic view illustrating an embodiment of a computer system.

Referring now to FIG. 10, an embodiment of a computer system 1000 suitable for implementing, for example, the user devices, nodes, and servers, is illustrated. It should be appreciated that other devices utilized in the voice-activated authentication and payment system may be implemented as the computer system 1000 in a manner as follows.

In accordance with various embodiments of the present disclosure, computer system 1000, such as a computer and/or a network server, includes a bus 1002 or other communication mechanism for communicating information, which interconnects subsystems and components, such as a processor 1004 (e.g., processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard, microphone), a cursor control component 1020 (e.g., mouse, pointer, or trackball), and/or a location determination component 1022 (e.g., a Global Positioning System (GPS) device as illustrated, a cell tower triangulation device, and/or a variety of other location determination devices known in the art). In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the user devices, server devices (including the payment provider server, merchant server, and authentication server), data stores, and nodes. Such instructions may be read into the system memory component 806 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 10806, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 114 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of authenticating voice data using a ledger, the method comprising:

receiving, by a node device configured to maintain a ledger comprising a plurality of blocks, a block of voice data comprising a first signature, the block of voice data generated based on one or more statements made by a participant in a real-time conversation, the first signature comprising a first hash of first voice features associated with the one or more statements made by the participant in the block of voice data;

comparing the first signature with a second signature associated with a latest block added in the ledger, wherein the latest block is associated with the real-time conversation, and wherein the second signature comprises a second hash of second voice features associated with the latest block in the ledger;

determining, based on a comparison between the first signature and the second signature, that a similarity between the first signature and the second signature is above a threshold value;

responsive to the determining, validating the block of voice data; and adding the validated block of voice data to the ledger, wherein adding the validated block of voice data to the ledger comprises adding a hash of the latest block to the block of voice data.

2. The method of claim 1, further comprising sending an updated ledger to at least one other node device.

3. The method of claim 1, further comprising:
receiving encrypted voice data associated with the block of voice data;
storing the encrypted voice data; and
adding a location of the stored encrypted voice data to the block of voice data.

4. The method of claim 1, wherein the first hash of first voice features and the second hash of second voice features are each results of a fuzzy hashing algorithm.

5. The method of claim 1, wherein the first voice features include at least one of a pitch, a tone, a speech speed, an enunciation, an intonation, a rate, or a rhythm.

6. The method of claim 1, wherein the block of voice data further comprises a plurality of transactions, and wherein each transaction of the plurality of transactions is associated with a statement of voice data and comprises a signature comprising a hash of voice features of the statement of voice data.

7. The method of claim 6, wherein:
comparing the first signature with a second signature comprises comparing each signature of the plurality of transactions with the second signature, and wherein the method further comprises:
determining a match when the comparing of each signature of the plurality of transactions with the second signature is above the threshold value.

8. The method of claim 1, further comprising:
receiving a second block of voice data, the second block of voice data generated based on one or more statements made by a second participant in the real-time conversation;
verifying the second block of voice data for inclusion on a second ledger; and
adding the second block of voice data to the second ledger.

9. The method of claim 8, further comprising:
receiving first encrypted voice data associated with the block of voice data associated with the real-time conversation;
receiving second encrypted voice data associated with the second block of voice data associated with the real-time conversation;

receiving an encryption key configured to decrypt the first encrypted voice data and the second encrypted voice data; and
sending the encryption key to a first device associated with the participant in the real-time conversation and to a second device associated with the second participant in the real-time conversation.

10. A system, comprising:
at least one node device, wherein each node device comprises:
a first non-transitory memory; and
one or more first hardware processors coupled to the first non-transitory memory and configured to execute instructions from the first non-transitory memory to cause the node device to perform operations comprising:
receiving a block of voice data comprising a first signature, wherein the block of voice data was generated based on one or more statements made by a participant in a real-time conversation, and wherein the first signature comprises a first hash of first voice features in the block of voice data;
comparing the first signature with a second signature associated with a latest block added in a ledger, wherein the latest block is associated with the real-time conversation, and wherein the second signature comprises a second hash of second voice features associated with the latest block in the ledger;
determining, based on a comparison between the first signature and the second signature, that a similarity between the first signature and the second signature is above a threshold value;
responsive to the determining, validating the block of voice data; and
adding the validated block of voice data to the ledger, wherein adding the validated block of voice data to the ledger comprises adding a hash of the latest block to the block of voice data.

11. The system of claim 10, wherein the operations further comprise:
receiving encrypted voice data associated with the block of voice data;
storing the encrypted voice data; and
adding a location of the stored encrypted voice data to the block of voice data.

12. The system of claim 10, wherein the first hash of first voice features and the second hash of second voice features are each results of a fuzzy hashing algorithm.

13. The system of claim 12, wherein:
the first signature comprises a first plurality of signatures each of the first plurality of signatures associated with one or more of the first voice features and the second signature comprises a second plurality of signatures each of the second plurality of signatures associated with one or more of the second voice features, and
comparing the first signature with the second signature comprises comparing the first plurality of signatures and the second plurality of signatures using a set comparison algorithm.

14. The system of claim 10, wherein the block of voice data further comprises a plurality of transactions, wherein each transaction of the plurality of transactions is associated with a statement of voice data and comprises a signature comprising a hash of voice features of the statement of voice data.

15. The system of claim 14, wherein:
comparing the first signature with a second signature comprises comparing each signature of the plurality of transactions with the second signature, and wherein the operations further comprise:
determining a match when the comparing each signature of the plurality of transactions with the second signature is above the threshold value.

16. A non-transitory machine-readable medium having instructions stored thereon, the instructions executable to cause performance of operations comprising:
receiving a block of voice data comprising a first signature, wherein the block of voice data was generated based on one or more statements made by a participant in a real-time conversation, and wherein the first signature comprises a first hash of first voice features in the block of voice data;
comparing the first signature with a second signature associated with a latest block added in a ledger, wherein the latest block is associated with the real-time conversation, and wherein the second signature comprises a second hash of second voice features associated with the latest block in the ledger;
determining, based on a comparison between the first signature and the second signature, that a similarity between the first signature and the second signature is above a threshold value;
responsive to the determining, validating the block of voice data; and
adding the validated block of voice data to the ledger, wherein adding the validated block of voice data to the ledger comprises adding a hash of the latest block to the block of voice data.

17. The non-transitory machine-readable medium of claim 16, wherein the operations further comprise:
receiving a second block of voice data, the second block of voice data generated based on one or more statements made by a second participant in the real-time conversation;
verifying the second block of voice data for inclusion on a second ledger; and
adding the second block of voice data to the second ledger.

18. The non-transitory machine-readable medium of claim 17, wherein the operations further comprise:
receiving first encrypted voice data associated with the block of voice data associated with the real-time conversation;
receiving second encrypted voice data associated with the second block of voice data associated with the real-time conversation;
receiving an encryption key configured to decrypt the first encrypted voice data and the second encrypted voice data; and
sending the encryption key to a first device associated with the participant in the real-time conversation and to a second device associated with the second participant in the real-time conversation.

19. The non-transitory machine-readable medium of claim 16, wherein the first hash of voice features and the second hash of voice features are each results of a fuzzy hashing algorithm.

\* \* \* \* \*